(12) United States Patent
Kimura

(10) Patent No.: US 10,550,802 B2
(45) Date of Patent: Feb. 4, 2020

(54) AIR CLEANER FOR INTERNAL COMBUSTION ENGINE

(71) Applicant: TOYOTA BOSHOKU KABUSHIKI KAISHA, Aichi (JP)

(72) Inventor: Ryusuke Kimura, Ichinomiya (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 12 days.

(21) Appl. No.: 15/862,140

(22) Filed: Jan. 4, 2018

(65) Prior Publication Data

US 2018/0195472 A1    Jul. 12, 2018

(30) Foreign Application Priority Data

Jan. 11, 2017  (JP) ................................. 2017-002600

(51) Int. Cl.
| | |
|---|---|
| *F02M 35/02* | (2006.01) |
| *B01D 46/00* | (2006.01) |
| *F02M 35/024* | (2006.01) |
| *F02M 25/08* | (2006.01) |
| *F02M 35/10* | (2006.01) |

(Continued)

(52) U.S. Cl.
CPC ..... *F02M 35/0201* (2013.01); *B01D 46/0036* (2013.01); *B01D 46/10* (2013.01); *B01D 46/521* (2013.01); *F02M 25/0854* (2013.01); *F02M 35/0202* (2013.01); *F02M 35/0203* (2013.01); *F02M 35/0218* (2013.01); *F02M 35/02458* (2013.01); *F02M 35/10144* (2013.01); *F02M 35/10334* (2013.01); *F02M 35/10347* (2013.01); *F02M 35/10354* (2013.01); *F02M 35/1272* (2013.01); *B01D 2253/102* (2013.01); *B01D 2259/4516* (2013.01); *B01D 2279/60* (2013.01);

(Continued)

(58) Field of Classification Search
CPC ........... F02M 35/0201; F02M 35/0202; F02M 35/10091; F02M 35/10334; F02M 35/10347; F02M 35/1227; F02M 35/1233; F02M 35/1272; F02M 35/1277
See application file for complete search history.

(56) References Cited

U.S. PATENT DOCUMENTS 5,391,099 A * 2/1995 Allain ................... F02B 61/045
440/77
5,647,314 A * 7/1997 Matsumura ........ F02M 35/1255
123/184.57

(Continued)

FOREIGN PATENT DOCUMENTS

EP            2256329 A1 * 12/2010    ......... F02M 35/0203
JP         H11-343939         12/1999

*Primary Examiner* — Kevin R Steckbauer

(74) *Attorney, Agent, or Firm* — Greenblum & Bernstein, P.L.C.

(57) ABSTRACT

An air cleaner includes a housing and a filter element located within the housing. The housing includes a housing body and a fiber molding assembly. The housing body is formed by a plastic molding. The housing body has a wall located upstream of the filter element in an air flow direction and a recess, which is an inwardly recessed part of the wall. The fiber molding assembly is fixed to the wall, covers the recess from outside, and forms a part of a side wall of an inlet passage together with the recess. A communication hole for communication between the inlet passage and an interior of the housing body is formed in the recess.

9 Claims, 4 Drawing Sheets

(51) Int. Cl.
  *F02M 35/12* (2006.01)
  *B01D 46/10* (2006.01)
  *B01D 46/52* (2006.01)
(52) U.S. Cl.
  CPC .. *F02M 35/10091* (2013.01); *F02M 35/10111* (2013.01)

(56) References Cited

U.S. PATENT DOCUMENTS

| | | | | |
|---|---|---|---|---|
| 5,649,986 A * | 7/1997 | Mueller | ............... | B01D 46/10 96/383 |
| 6,340,322 B1 * | 1/2002 | Yoshida | ............... | F01N 13/00 440/89 C |
| 6,517,595 B2 * | 2/2003 | Kino | ............... | F02M 35/10118 123/198 E |
| 6,553,953 B1 * | 4/2003 | Fujihara | ............ | F02M 35/10144 123/184.21 |
| 6,622,680 B2 * | 9/2003 | Kino | ............... | B29C 65/2015 123/184.21 |
| 7,080,619 B2 * | 7/2006 | Kino | ............... | B01D 46/10 123/184.57 |
| 7,082,915 B2 * | 8/2006 | Tanikawa | ............ | F02M 35/10039 123/184.42 |
| 7,086,365 B1 * | 8/2006 | Teeter | ............... | F02M 35/10098 123/184.21 |
| 7,621,372 B2 * | 11/2009 | Yamaura | ............... | F02M 35/02 123/184.21 |
| 7,802,651 B2 * | 9/2010 | Park | ............... | B01D 46/10 181/224 |
| 9,657,693 B2 * | 5/2017 | Berisha | ............... | B01D 46/0036 |
| 9,945,335 B2 * | 4/2018 | Jackson | ............... | F02M 35/0218 |
| 10,054,087 B2 * | 8/2018 | Yamamoto | ............ | F02M 35/162 |
| 10,100,789 B2 * | 10/2018 | Ozaki | ............... | B62K 11/04 |
| 10,227,957 B2 * | 3/2019 | Ozaki | ............... | F02M 35/0201 |
| 2001/0011448 A1 * | 8/2001 | Kino | ............... | F02M 35/10118 55/385.3 |
| 2002/0019180 A1 * | 2/2002 | Yoshida | ............... | F01N 13/00 440/89 J |
| 2003/0062013 A1 * | 4/2003 | Kino | ............... | B29C 65/2015 123/184.53 |
| 2004/0194750 A1 * | 10/2004 | Tanikawa | ............ | F02M 35/10039 123/184.42 |
| 2004/0226531 A1 * | 11/2004 | Kino | ............... | B01D 46/10 123/184.21 |
| 2007/0278034 A1 * | 12/2007 | Yamaura | ............... | F02M 35/02 181/229 |
| 2014/0196977 A1 * | 7/2014 | Hartmann | ............ | F02M 35/1283 181/227 |
| 2017/0152821 A1 * | 6/2017 | Yamamoto | ............ | F02M 35/162 |
| 2017/0241381 A1 * | 8/2017 | Ozaki | ............... | F02M 35/048 |
| 2017/0284347 A1 * | 10/2017 | Ozaki | ............... | B62K 11/04 |
| 2017/0321640 A1 * | 11/2017 | Kimura | ............... | F02M 35/0201 |
| 2018/0058395 A1 * | 3/2018 | Inuzuka | ............... | F02M 35/0201 |
| 2018/0058397 A1 * | 3/2018 | Kimura | ............... | E04B 1/84 |
| 2018/0156172 A1 * | 6/2018 | Jean | ............... | F02M 35/1216 |
| 2018/0195471 A1 * | 7/2018 | Kimura | ............... | B01D 46/10 |
| 2018/0340499 A1 * | 11/2018 | Inuzuka | ............... | F02M 35/14 |
| 2018/0363604 A1 * | 12/2018 | Miyashita | ............ | F02M 35/161 |
| 2019/0072060 A1 * | 3/2019 | Kimura | ............... | B29C 65/7814 |

* cited by examiner

AIR CLEANER FOR INTERNAL COMBUSTION ENGINE

BACKGROUND OF THE INVENTION

The present invention relates to an air cleaner for an internal combustion engine.

Japanese Laid-Open Patent Publication No. 11-343939 discloses an air intake duct for an internal combustion engine that is formed through compression molding of nonwoven fabric containing thermoplastic resin binder. The walls of the air intake duct disclosed in the publication have a certain degree of air permeability. Accordingly, a part of sound waves of intake noise goes through the duct walls. This suppresses generation of standing waves of the intake noise and reduces intake noise.

In the engine compartment of a vehicle, many parts other than the air intake duct are installed. Accordingly, for some types of vehicles, it may be difficult to accommodate the length of the air intake duct due to space limitations within the engine compartment. In such a case, even if the air intake duct as disclosed in the above publication is employed, it is almost impossible to absorb sound waves through the duct walls, so that the reduction of intake noise would be difficult.

It is an objective of the present invention to provide an air cleaner for an internal combustion engine that reduces intake noise while preventing an increase of its size.

SUMMARY OF THE INVENTION

One aspect of the present invention is an air cleaner for an internal combustion engine. The air cleaner includes a housing having an inlet passage for introducing intake air and an outlet passage for discharging the intake air. The air cleaner also includes a filter element located within the housing. The housing includes a housing body formed by a plastic molding. The housing body has a wall located upstream of the filter element in an air flow direction and a recess, which is an inwardly recessed part of the wall. The housing also includes a fiber molding assembly, which is fixed to the wall, covers the recess from outside, and forms a part of a side wall of the inlet passage together with the recess. A communication hole for communication between the inlet passage and an interior of the housing body is formed in the recess.

According to this structure, at least a part of the inlet passage is housed in the recess formed on the wall of the housing body, so that this structure prevents an increase of the size of the entire housing including the inlet passage and the housing body.

Further, according to this structure, a part of walls of the inlet passage has air permeability as it is formed by the fiber molding assembly. Accordingly, a part of the sound waves of intake noise in the inlet passage goes through the fiber molding assembly. This suppresses the generation of standing waves of the intake noise. Further, the sound waves of the intake noise resonate with the fibers constituting the fiber molding assembly. This weakens the energy of the intake noise.

Further, a wall of a plastic molding that forms the recess is present between the inlet passage and the housing body. Accordingly, the sound waves of intake noise in the housing body do not go through the wall of the inlet passage to reach the interior of the inlet passage. Conversely, the sound waves of intake noise in the inlet passage do not go through the wall of the inlet passage to reach the interior of the housing body. This suppresses the interference between the intake noise in the housing body and the intake noise in the inlet passage.

These structures reduce intake noise.

Other aspects and advantages of the embodiments will become apparent from the following description, taken in conjunction with the accompanying drawings, illustrating by way of example the principles of the invention.

BRIEF DESCRIPTION OF THE DRAWINGS

The embodiments, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

In the following, a first embodiment will be described with reference to FIGS. 1 to 5.

Figure 1:
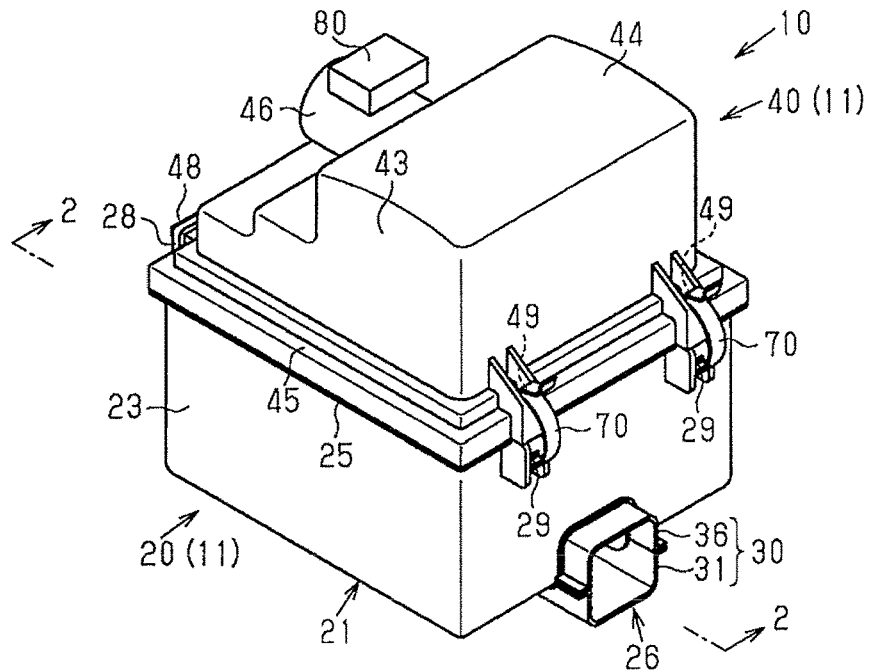
FIG. 1 is a perspective view from above of an air cleaner for an internal combustion engine according to a first embodiment.
Figure 2:
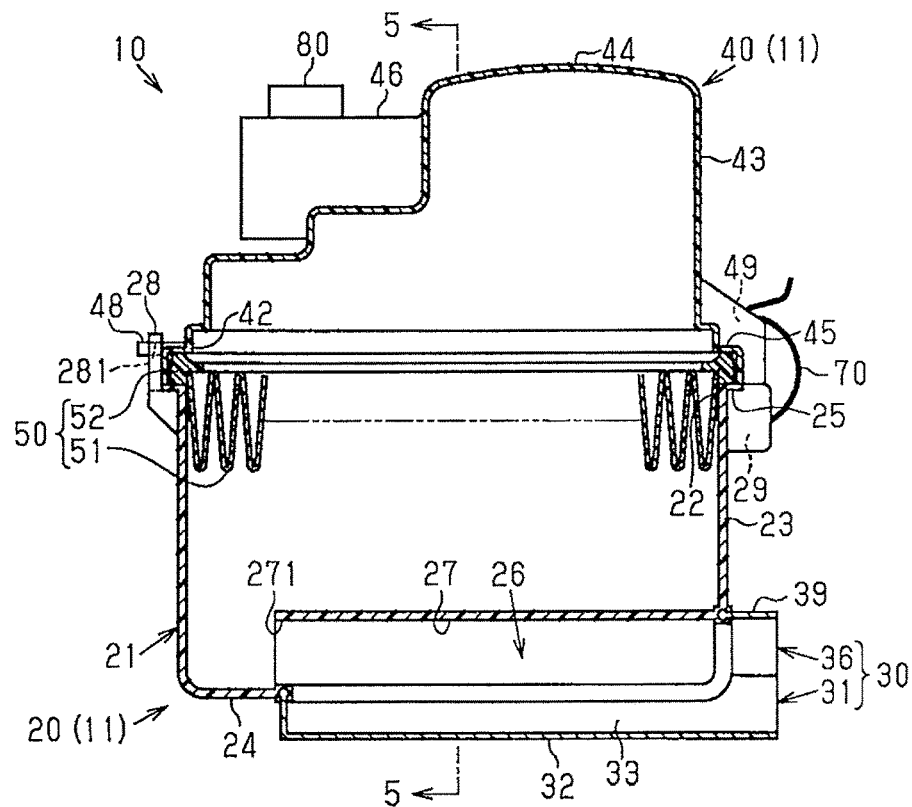
FIG. 2 is a cross-sectional view taken along line 2-2 of FIG. 1.

As shown in FIGS. 1 and 2, an air cleaner 10 is arranged in the air intake passage of a vehicle internal combustion engine. The air cleaner 10 includes a housing 11 and a filter element 50 located within the housing 11. The housing 11 includes an inlet passage 26 for introducing intake air and an outlet passage 46 for discharging the intake air.

As shown in FIG. 2, the housing 11 includes a case 20 and a cap 40 detachably attached to the case 20.

The case 20 includes a case circumferential wall 23 surrounding a case opening 22, a case bottom wall 24 arranged on the side opposite to the case opening 22, and the inlet passage 26.

The cap 40 includes a cap circumferential wall 43 surrounding a cap opening 42, a cap bottom wall 44 arranged on the side opposite to the cap opening 42, and the outlet passage 46.

In the following description, a circumferential direction of the case opening 22 and a circumferential direction of the cap opening 42 will be referred to as a "circumferential direction."

Case 20

As shown in FIGS. 1 and 2, the case 20 includes a case body 21. The case 20 is made of a hard plastic and has the case circumferential wall 23 and the case bottom wall 24. In other words, the case body 21 is formed by a plastic molding.

As shown in FIG. 2, a case flange 25 is formed on the entire peripheral portion of the case opening 22.

A pair of arches 28 is formed on the outer surface of one side (left in FIG. 2) of the case circumferential wall 23. The arches 28 are spaced from each other in the circumferential direction and protrude upwardly. Each of the arches 28 has an engaging hole 281. In FIGS. 1 and 2, only one of the arches 28 is shown.

A pair of supports 29 is formed on the outer surface of the side (right in FIG. 2) of the case circumferential wall 23 opposite to the side on which the arches 28 are formed. The supports 29 are spaced from each other in the circumferential direction. A pair of clamps 70 is supported by the supports 29 in a tiltable manner.

Figure 3:
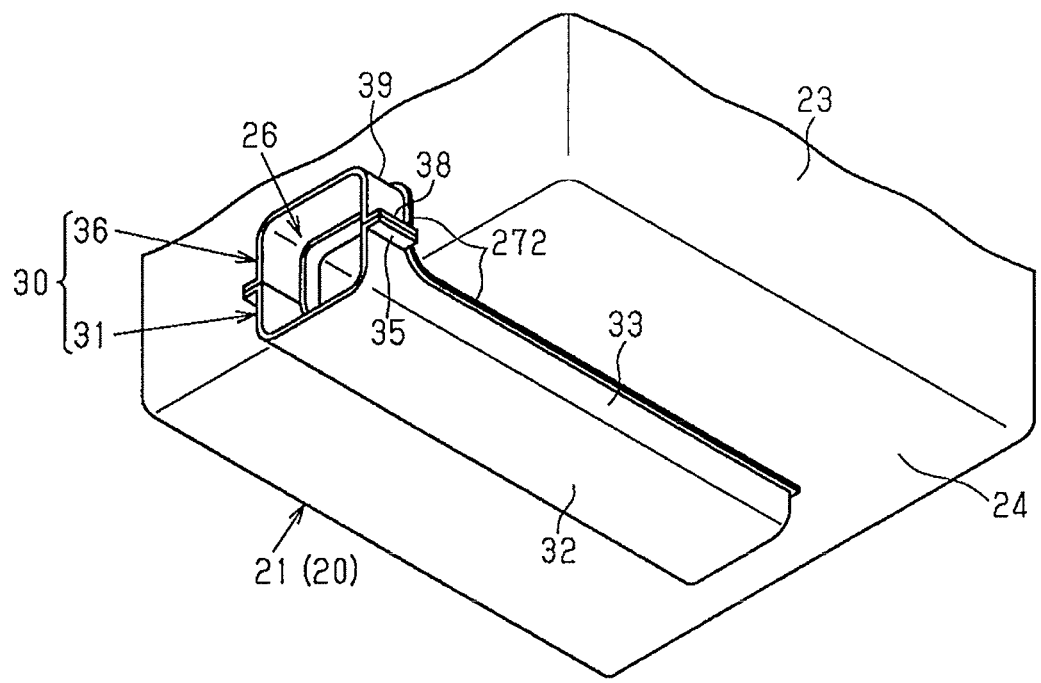
FIG. 3 is a perspective view from below of a lower portion of a case according to the first embodiment.

As shown in FIGS. 1 to 3, the case body 21 has a recess 27. The recess 27 is formed by inwardly recessing a part of the case bottom wall 24. The recess 27 extends halfway from the case bottom wall 24 to the case circumferential wall 23.

A fiber molding assembly 30 is joined to the case circumferential wall 23 and the case bottom wall 24. The fiber molding assembly 30 covers the recess 27 and forms a part of the side walls of the inlet passage 26 together with the recess 27.

The fiber molding assembly 30 protrudes outwardly beyond the outer surface of the case bottom wall 24 in a radial direction of the inlet passage 26. Further, the fiber molding assembly 30 includes a tubular protrusion 39. The protrusion 39 protrudes outwardly beyond the outer surface of the case circumferential wall 23 in the extending direction of the inlet passage 26.

As shown in FIG. 2, in the recess 27, a communication hole 271 for communication between the inlet passage 26 and an interior of the case body 21 is formed. In the present embodiment, the communication hole 271 is formed at an end in the extending direction of the inlet passage 26.

In the following, the structure of the fiber molding assembly 30 is described in detail.

As shown in FIGS. 1 to 4, the fiber molding assembly 30 includes a lower molding 31 and an upper molding 36, each of which has a half-split tubular shape.

Each of the lower molding 31 and the upper molding 36 contains base fiber made of thermoplastic resin and binder fiber made of thermoplastic resin having a melting point lower than that of the base fiber. The binder fiber is thermally fused to the base fiber in order to bind filaments in the base fiber together. The present embodiment uses polyethylene terephthalate (PET) for the base fiber and uses modified PET for the binder fiber.

Preferably, the weight per unit area of each of the lower molding 31 and the upper molding 36 ranges from 300 to 1500 g/m². In the present embodiment, the weight per unit area of each of the lower molding 31 and the upper molding 36 is set to 800 g/m².

Preferably, the thickness of each of the lower molding 31 and the upper molding 36 ranges from 1.0 to 3.0 mm. In the present embodiment, the thickness of each of the lower molding 31 and the upper molding 36 is set to 1.5 mm.

Preferably, the compounding ratio of the binder fiber in each of the lower molding 31 and the upper molding 36 ranges from 30 to 70%. In the present embodiment, the compounding ratio of the binder fiber is set to 50%.

The lower molding 31 and the upper molding 36 are formed by hot pressing a nonwoven fabric sheet made of the base fiber and the binder fiber.

Lower Molding 31

Figure 4:
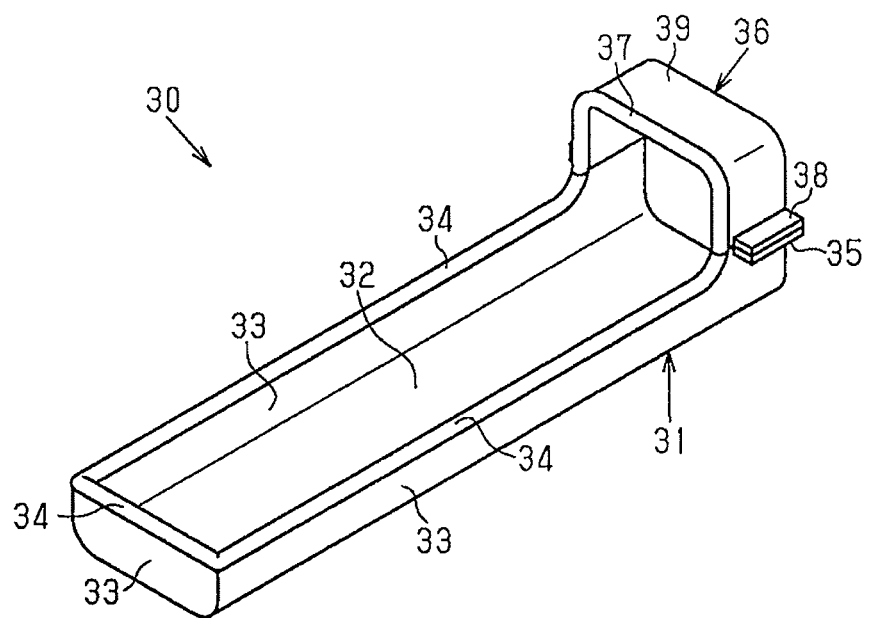
FIG. 4 is a perspective view from above of a fiber molding assembly according to the first embodiment.

As shown in FIGS. 2 to 4, the lower molding 31 constitutes a portion of the fiber molding assembly 30 that protrudes downwardly beyond the outer surface of the case bottom wall 24. The lower molding 31 includes three side walls 33 and a bottom wall 32 having a rectangular shape when seen from below. The three side walls 33 bend from three sides excluding the side that corresponds to the inlet of the inlet passage 26 among the four sides of the bottom wall 32, and the three side walls 33 extend toward the case bottom wall 24.

As shown in FIGS. 3 and 4, a flange 35 is formed at each of a pair of upper edges of a part of the lower molding 31 that constitutes the protrusion 39.

The packing density of the fibers of the flange 35, namely, the degree of compression of the fibers of the flange 35 is set to be higher than the packing densities (the degrees of compression) of the fibers of the other portions of the lower molding 31.

As shown in FIG. 4, the packing density of the fibers of an upper edge 34 of the side walls 33, namely, the degree of compression of the fibers of the edge 34 is set to be lower than the packing densities (the degrees of compression) of the fibers of the other portions of the lower molding 31.

Upper Molding 36

As shown in FIGS. 3 and 4, the upper molding 36 constitutes the upper portion of the protrusion 39. A flange 38 is formed at each lower edge of the upper molding 36.

The packing density of the fibers of the flange 38, namely, the degree of compression of the fibers of the flange 38 is set to be higher than the packing densities (the degrees of compression) of the fibers of the other portions of the upper molding 36.

As shown in FIG. 4, the packing density of the fibers of an inner edge 37 of the upper molding 36, namely, the degree of compression of the fibers of the edge 37 is set to be lower than the packing densities (the degrees of compression) of the fibers of the other portions of the upper molding 36.

With the flange 35 and the flange 38 brought into contact with each other, the lower molding 31 is joined to the upper molding 36 via the binder resin contained in each of the flange 35 and the flange 38.

The case body 21 is integrally formed with the fiber molding assembly 30 by insert molding.

Figure 5:
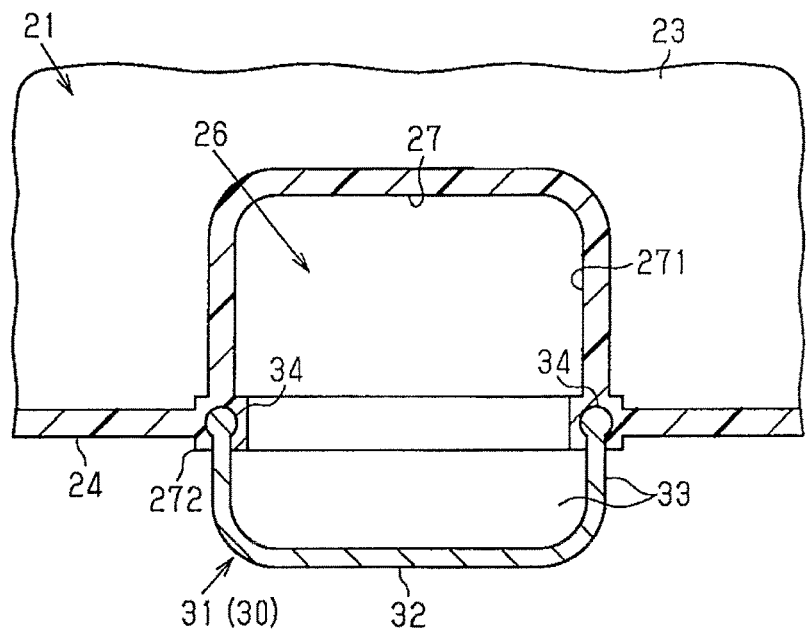
FIG. 5 is a cross-sectional view taken along line 5-5 of FIG. 2.

As shown in FIGS. 3 and 5, the edge 34 of the lower molding 31 and the edge 37 of the upper molding 36 are entirely covered by a peripheral portion 272 of the recess 27, so that the fiber molding assembly 30 is integrally formed with the case body 21. In other words, the edge 34 and the edge 37 of the fiber molding assembly 30 are entirely covered by the peripheral portion 272 of the recess 27, so that the fiber molding assembly 30 is integrally formed with the case body 21.

Cap 40

As shown in FIGS. 1 and 2, the cap 40 includes the cap circumferential wall 43 and the cap bottom wall 44, each of which is made of a hard plastic. In other words, the cap 40 is formed by a plastic molding.

As shown in FIG. 2, a cap flange 45 is formed on the entire peripheral portion of the cap opening 42.

On the cap circumferential wall 43, the tubular outlet passage 46 protruding outwardly is formed. On the outlet passage 46, an air flowmeter 80 for detecting the flow rate of intake air is installed.

A pair of engaging protrusions 48 is formed on the outer surface of the cap circumferential wall 43. The engaging protrusions 48 are located at portions corresponding to the pair of arches 28 of the case 20. The engaging protrusions 48 are inserted into and engaged with the engaging holes 281 of the arches 28, which constitutes a hinge mechanism for tiltably supporting the cap 40 relative to the case 20. FIGS. 1 and 2 show only one of the arches 28 and the corresponding engaging protrusion 48.

A pair of catch portions 49 is formed on the outer surface of the cap circumferential wall 43. The catch portions 49 are located at portions corresponding to the pair of supports 29 (clamps 70) of the case 20. The two clamps 70, which are tiltably supported by the supports 29, are hooked to the catch portions 49, which constitutes a fastening mechanism for fastening the cap 40 on the case 20.

Filter Element 50

As shown in FIG. 2, the filter element 50 includes a filtration portion 51 formed by pleating a filtering material sheet and an annular sealing portion 52 arranged on a peripheral portion of the filtration portion 51. Preferably, nonwoven fabric, filter paper, or the like is used for the filtering material sheet. The sealing portion 52 is made of elastic foam such as closed-cell polyurethane.

With the filtration portion 51 placed between the case opening 22 and the cap opening 42, which is arranged opposite to the case opening 22, the sealing portion 52 is sandwiched by the case flange 25 and the cap flange 45, so that the sealing portion 52 seals against the cap 40.

In the following, the operation of the first embodiment will be described.

In the air cleaner 10 according to the first embodiment, the recess 27 is formed on the case circumferential wall 23 and the case bottom wall 24 of the case body 21. The case circumferential wall 23 and the case bottom wall 24 are located upstream of the filter element 50 in the air flow direction. A part of the inlet passage 26 is housed in the recess 27. This prevents an increase of the size of the entire case 20 including the inlet passage 26 and the case body 21.

Further, a part of the walls of the inlet passage 26 has air permeability as it is formed by the fiber molding assembly 30. Accordingly, a part of the sound waves of intake noise in the inlet passage 26 goes through the fiber molding assembly 30. This suppresses the generation of standing waves of the intake noise. Further, the sound waves of the intake noise resonate with the fibers constituting the fiber molding assembly 30. This weakens the energy of the intake noise.

Further, a wall of a plastic molding that forms the recess 27 is present between the inlet passage 26 and the case body 21. Accordingly, sound waves of Intake noise in the case body 21 do not go through the wall of the inlet passage 26 to reach the interior of the inlet passage 26. Conversely, sound waves of intake noise in the inlet passage 26 do not go through the wall of the inlet passage 26 to reach the interior of the case body 21. This suppresses the interference between the intake noise in the case body 21 and the intake noise in the inlet passage 26.

The above-described operation reduces the intake noise.

The air cleaner for an internal combustion engine according to the first embodiment described above provides the following advantages.

(1) The case 20 of the air cleaner 10 includes the case body 21, which is formed by a plastic molding, and the fiber molding assembly 30. The case body 21 constitutes a housing body and includes the recess 27 and walls having the case circumferential wall 23 and the case bottom wall 24. The recess 27 is formed by recessing a part of the walls, specifically, by inwardly recessing a part of the case bottom wall 24. The fiber molding assembly 30 is fixed to the walls (the case circumferential wall 23 and case bottom wall 24). The fiber molding assembly 30 covers the recess 27 and forms a part of side walls of the inlet passage 26 together with the recess 27. In the recess 27, the communication hole 271 for communication between the inlet passage 26 and the interior of the case body 21 (housing body) is formed.

Such a structure operates in the above described manner, so that the structure prevents an increase of the size of the air cleaner 10 and reduces intake noise.

(2) The fiber molding assembly 30 includes the tubular protrusion 39 protruding outwardly beyond the outer surface of the case circumferential wall 23 in the extending direction of the inlet passage 26.

According to such a structure, the fiber molding assembly 30 includes the tubular protrusion 39. This structure increases the surface area of the fiber molding assembly 30 and increases the length of the inlet passage 26. This improves the intake noise reducing performance of the fiber molding assembly 30.

(3) The fiber molding assembly 30 protrudes outwardly beyond the outer surface of the case bottom wall 24 in the radial direction of the inlet passage 26. This structure increases the surface area of the fiber molding assembly 30. This improves the intake noise reducing performance of the fiber molding assembly 30. Further, the above structure increases the internal space of the case body 21 in comparison to a structure in which the entire inlet passage 26 is housed in the case body 21.

(4) The peripheral portion 272 of the recess 27 covers the edge 34 and the edge 37 of the fiber molding assembly 30, so that the case body 21 is integrally formed with the fiber molding assembly 30. The packing densities of the fibers of the edge 34 and the edge 37 of the fiber molding assembly 30 are set to be lower than the packing densities of the fibers of the other portions of the fiber molding assembly 30, which are not covered by the peripheral portion 272.

According to such a structure, the packing densities of the fibers of the edge 34 and the edge 37 of the fiber molding assembly 30 are set to be lower than those of the other portions. Thus, when the case body 21 is produced with the fiber molding assembly 30 incorporated therein through insert molding of resin, the edge 34 and the edge 37 of the fiber molding assembly 30 are likely to be impregnated with the resin in a molten state. Accordingly, the edge 34 and the edge 37 of the fiber molding assembly 30 are firmly joined to the case bottom wall 24 and the case circumferential wall 23 of the case body 21 due to the anchor effect. This structure securely fixes the fiber molding assembly 30 to the case circumferential wall 23 and the case bottom wall 24.

(5) The fiber molding assembly 30 contains base fiber and binder fiber having a melting point lower than that of the base fiber. The binder fiber is thermally fused to the base fiber in order to bind filaments in the base fiber together.

Such a structure readily forms the lower molding 31 and the upper molding 36 by hot-pressing a nonwoven fabric sheet made of the base fiber and the binder fiber.

Second Embodiment

In the following, a second embodiment will be described with reference to FIG. 6 mainly for differences from the first embodiment.

Figure 6:
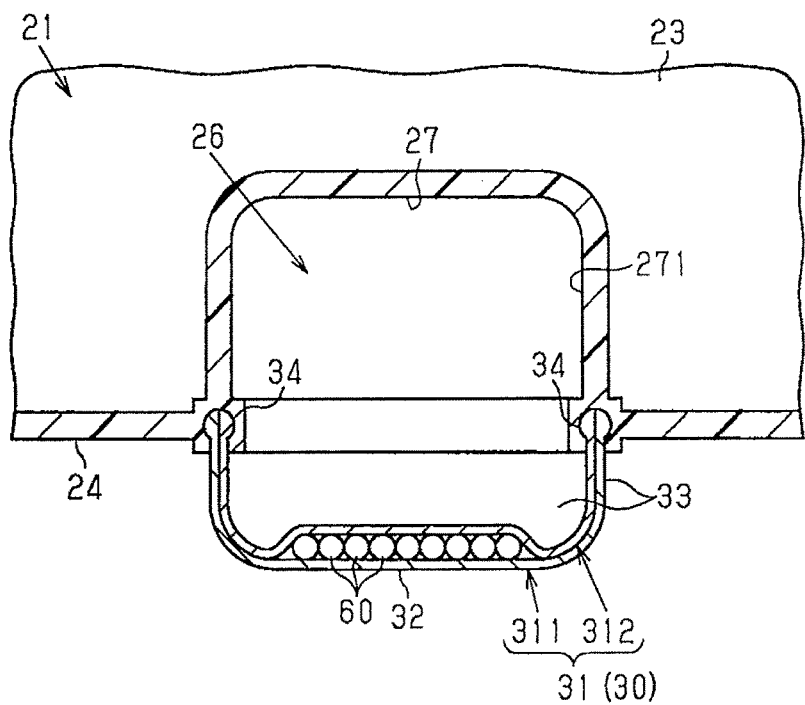
FIG. 6 is a cross-sectional view corresponding to FIG. 5, illustrating an air cleaner according to a second embodiment.

As shown in FIG. 6, the lower molding 31 of the fiber molding assembly 30 according to the second embodiment includes an outer molding 311 and an inner molding 312 placed on the inner surface of the outer molding 311. An adsorbent 60 for adsorbing fuel vapor of the internal combustion engine is placed between the outer molding 311 and the inner molding 312. The adsorbent 60 in the present embodiment is granulated active carbon.

The outer molding 311 has the same structure as in the lower molding 31 and the upper molding 36 according to the first embodiment. In the present embodiment, the thickness of the outer molding 311 is set to 0.75 mm.

The inner molding 312 contains base fiber made of a thermoplastic resin and contains binder fiber made of a thermoplastic resin having a melting point lower than that of the base fiber. The binder fiber is thermally fused to the base fiber in order to bind filaments in the base fiber together. The present embodiment uses polyethylene terephthalate (PET) for the base fiber and uses modified PET for the binder fiber.

Preferably, the weight per unit area of the inner molding 312 ranges from 30 to 150 g/m$^2$. In the present embodiment, the weight per unit area of the inner molding 312 is set to 60 g/m$^2$.

Preferably, the thickness of the inner molding 312 ranges from 0.1 to 1.5 mm. In the present embodiment, the thickness of the inner molding 312 is set to 0.75 mm. In other words, the total thickness of the outer molding 311 and the inner molding 312 placed together is set to 1.5 mm.

Preferably, the compounding ratio of the binder fiber in the inner molding 312 ranges from 30 to 70%. In the present embodiment, the compounding ratio of the binder fiber is set to 50%.

The inner molding 312 is formed by hot-pressing a nonwoven fabric sheet made of the base fiber and the binder fiber.

In the present embodiment, the outer molding 311 and the inner molding 312 are formed separately. The lower molding 31 in the present embodiment is formed by hot-pressing the outer molding 311 and the inner molding 312 while interposing the adsorbent 60 between the outer molding 311 and the inner molding 312.

In the following, the operation of the second embodiment will be described.

In the air cleaner 10 according to the second embodiment, when the engine is in a stopped state, a part of fuel vapor flowing backward from the combustion chamber or the like is adsorbed to the adsorbent 60 through the fibers of the inner molding 312. When the engine is in operation, the fuel adsorbed to the adsorbent 60 is removed by intake air and processed by combustion.

Further, the adsorbent 60 is placed inside the lower molding 31, which forms a part of the walls of the inlet passage 26. Accordingly, the air flow within the air intake passage is not disturbed by the adsorbent 60.

The air cleaner for an internal combustion engine according to the second embodiment described above provides the following advantages.

(6) The lower molding 31 of the fiber molding assembly 30 includes the outer molding 311 and the inner molding 312 placed on the inner surface of the outer molding 311. The adsorbent 60 for adsorbing fuel vapor of the internal combustion engine is placed between the outer molding 311 and the inner molding 312.

Such a structure operates in the above described manner, so that the structure processes fuel vapor properly while preventing an increase of pressure loss.

Third Embodiment

In the following, a third embodiment will be described with reference to FIGS. 7 and 8.

Figure 7:
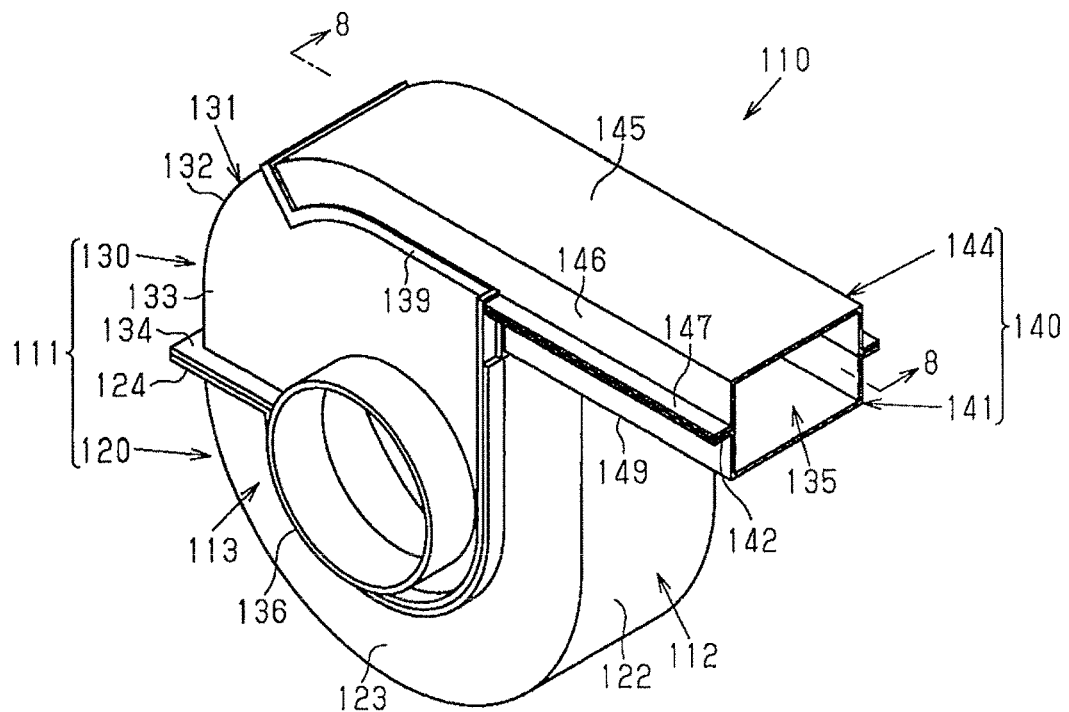
FIG. 7 is a perspective view from above of an air cleaner according to a third embodiment.
Figure 8:
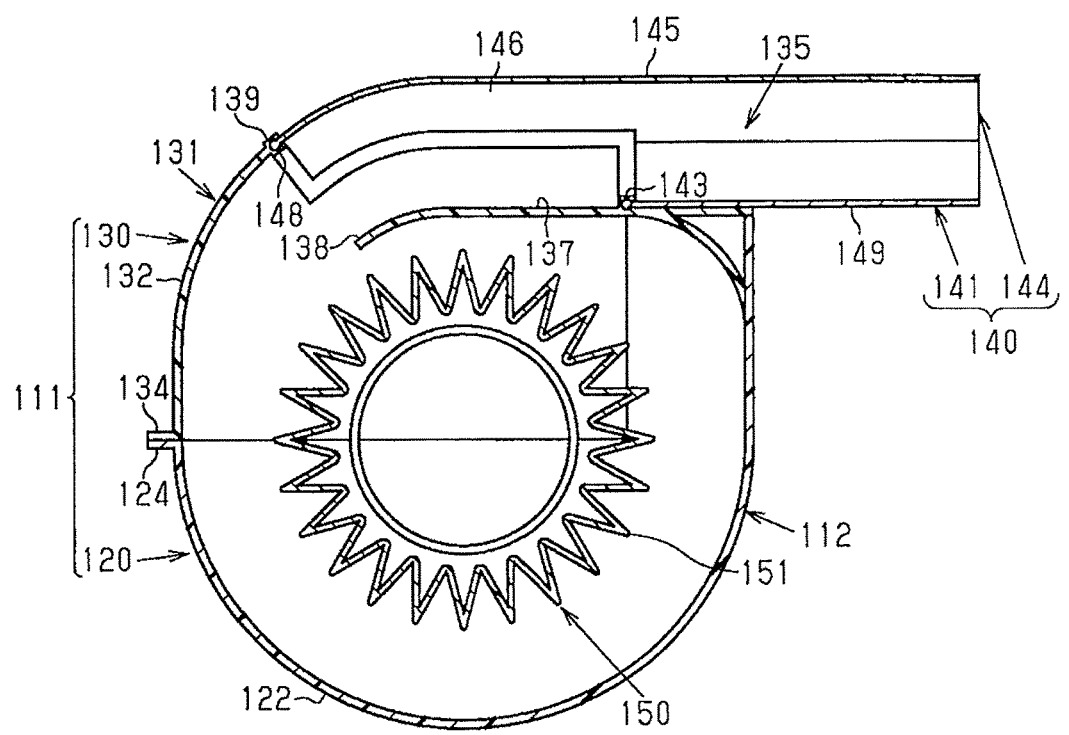
FIG. 8 is a cross-sectional view taken along line 8-8 of FIG. 7.

As shown in FIGS. 7 and 8, an air cleaner 110 according to the third embodiment includes a housing 111. The housing includes a tubular circumferential wall 112, a bottom wall 113 arranged at an end in the axial direction of the circumferential wall 112, and a housing 111 having a bottom wall placed at the opposite end.

On the circumferential wall 112 of the housing 111, an inlet passage 135 extending in a tangential direction of the circumferential wall 112 is formed. On the bottom wall 113 of the housing 111, a tubular outlet passage 136 protruding outwardly is formed.

A filter element 150 including a tubular filtration portion 151 is housed in the housing 111. The filtration portion 151 is formed to have a cylindrical shape by pleating a filtering material sheet. At both ends in the axial direction of the filtration portion 151, a sealing member (not shown) for sealing the gap between the filtration portion 151 and the inner surface of the housing 111 is arranged. Preferably, nonwoven fabric, filter paper, or the like is used for the filtering material sheet. The sealing member is made of elastic foam such as closed-cell polyurethane.

The housing 111 includes a case 120 and a cap 130 detachably attached to the case 120.

The case 120 includes a case circumferential wall 122 and a case bottom wall 123. The case circumferential wall 122 mainly constitutes the lower portion of the circumferential wall 112. The case bottom wall 123 mainly constitutes the outer circumferential portion in the lower portion of the bottom wall 113. A case flange 124 is formed on the peripheral portions of the case circumferential wall 122 and the case bottom wall 123. The case 120 is made of a hard plastic.

The cap 130 includes a cap body 131. The cap body 131 includes a cap circumferential wall 132 and a cap body 131. The cap circumferential wall 132 constitutes a part of the circumferential wall 112. The cap bottom wall 133 constitutes the upper portion and the central portion of the bottom wall 113. A cap flange 134 is formed on the peripheral portions of the cap circumferential wall 132 and the cap bottom wall 133. The cap body 131 is made of a hard plastic.

As shown in FIG. 8, a recess 137 is formed in the upper portion of the cap body 131. The recess 137 is formed by inwardly recessing the cap circumferential wall 132. A fiber molding assembly 140 is joined to the cap circumferential wall 132 and the cap bottom wall 133. The fiber molding assembly 140 covers the recess 137 and forms a part of the side walls of the inlet passage 135 together with the recess 137.

As shown in FIGS. 7 and 8, the fiber molding assembly 140 includes a tubular protrusion 149 protruding outwardly beyond the outer surface of the cap circumferential wall 132 in the extending direction of the inlet passage 135.

As shown in FIG. 8, on the recess 137, a communication hole 138 for communication between the inlet passage 135 and the interior of the cap body 131 is formed. In the present embodiment, the communication hole 138 is formed at an end in the extending direction of the inlet passage 135.

The fiber molding assembly 140 includes a lower molding 141 and an upper molding 144, each of which has a half-split tubular shape.

Lower Molding 141

The lower molding 141 constitutes the lower portion of the protrusion 149. A flange 142 is formed at each upper edge of the lower molding 141.

Upper Molding 144

The upper molding 144 includes a top wall 145 and side walls 146 bending from the opposite sides of the top wall 145 and extending toward the cap bottom wall 133.

In the upper molding 144, a flange 147 is formed at each of two lower edges constituting the protrusion 149.

With the flanges 142, 147 brought into contact with each other, the lower molding 141 is joined to the upper molding 144 via the binder resin contained in each of the flange 142 and the flange 147.

The cap body 131 is integrally formed with the fiber molding assembly 140 through insert molding.

As shown in FIG. 8, an edge 143 of the lower molding 141 and an edge 148 of the upper molding 144 are entirely covered by a peripheral portion 139 of the recess 137, so that the fiber molding assembly 140 is integrally formed with the cap body 131. In other words, the edge 143 and the edge 148 of the fiber molding assembly 140 are entirely covered by the peripheral portion 139 of the recess 137, so that the fiber molding assembly 140 is integrally formed with the cap body 131.

The air cleaner for an internal combustion engine according to the third embodiment described above provides the same advantages as (1), (2), (4), and (5) provided by the first embodiment. In the third embodiment, the cap body 131 corresponds to the housing body. Further, the cap circumferential wall 132 corresponds to the wall placed upstream of the filter element 150 in the air flow direction in the cap body 131 (housing body).

Modifications

It should be apparent to those skilled in the art that the present invention may be embodied in many other specific forms without departing from the scope of the invention. Particularly, it should be understood that the present invention may be embodied in the following forms.

The upper molding 144 of the third embodiment may be configured to have a double structure with an outer molding and an inner molding as in the lower molding 31 of the second embodiment. An adsorbent may be placed between the outer molding and the inner molding.

At least one of the base fiber and the binder fiber constituting the fiber molding assembly 30 and the fiber molding assembly 140 may be made of other thermoplastic resin such as polypropylene (PP).

In place of the binder fiber, powders or the like of thermoplastic resin may be used for a binder in order to bind filaments in the base fiber together.

In the first embodiment, the case body 21 is produced to incorporate the fiber molding assembly 30 through insert molding, so that the fiber molding assembly 30 is fixed to the case body 21. However, the fiber molding assembly 30 may be fixed to the case body 21 via adhesion or the like. Further, the same change may be made in the third embodiment.

In the first embodiment and the second embodiment, the bottom wall 32 of the fiber molding assembly 30 may be flush with the case bottom wall 24 of the case body 21. In this case, the side wall 33 of the lower molding 31 may be removed, and the peripheral portion 272 of the recess 27 may cover the edge of the bottom wall 32.

In the first embodiment and the second embodiment, the upper molding 36 may be removed, and a portion corresponding to the upper molding 36 may be integrally formed with the case body 21 using a plastic molding. In other words, the fiber molding assembly 30 may be configured by only the lower molding 31. Further, in the third embodiment, the lower molding 141 may be removed, and a portion corresponding to the lower molding 141 may be integrally formed with the cap body 131 using a plastic molding. In other words, the fiber molding assembly 140 may be configured by only the upper molding 144.

In the first embodiment and the second embodiment, the protrusion 39 of the fiber molding assembly 30 may be removed. Further, in the third embodiment, the protrusion 149 of the fiber molding assembly 140 may be removed.

The present examples and embodiments are to be considered as illustrative and not restrictive, and the invention is not to be limited to the details given herein, but may be modified within the scope and equivalence of the appended claims.

The invention claimed is:

1. An air cleaner for an internal combustion engine, the air cleaner comprising:
   a housing including an inlet passage for introducing intake air and an outlet passage for discharging the intake air; and
   a filter element located within the housing, wherein
   the housing includes
      a housing body formed by a plastic molding, wherein the housing body has a wall located upstream of the filter element in an air flow direction and a recess, which is an inwardly recessed part of the wall, and
      a fiber molding assembly, which is fixed to the wall, covers the recess from outside, and forms a part of a side wall of the inlet passage together with the recess,
   wherein a communication hole for communication between the inlet passage and an interior of the housing body is formed in the recess,
   the whole of the fiber molding assembly is located upstream of the filter element in the air flow direction, and
   wherein the inlet passage extends in an extending direction, and
   the communication hole is formed at an end of the inlet passage in the extending direction.

2. The air cleaner for an internal combustion engine according to claim 1, wherein the fiber molding assembly includes a tubular protrusion protruding outwardly beyond an outer surface of the wall in an extending direction of the inlet passage.

3. The air cleaner for an internal combustion engine according to claim 1, wherein the fiber molding assembly protrudes outwardly beyond an outer surface of the wall in a radial direction of the inlet passage.

4. The air cleaner for an internal combustion engine according to claim 1, wherein
   a peripheral portion of the recess covers an edge of the fiber molding assembly such that the housing body is integrally formed with the fiber molding assembly, and
   a packing density of fibers of the edge of the fiber molding assembly is set to be lower than a packing density of fibers of another portion of the fiber molding assembly that is not covered by the peripheral portion.

5. The air cleaner for an internal combustion engine according to claim 1, wherein the fiber molding assembly contains
   a base fiber, and
   a binder fiber having a melting point lower than a melting point of the base fiber, the binder fiber being thermally fused to the base fiber in order to bind filaments in the base fiber together.

6. The air cleaner for an internal combustion engine according to claim 5, wherein
   the fiber molding assembly includes an outer molding and an inner molding placed on an inner surface of the outer molding, and an adsorbent for adsorbing fuel vapor of the internal combustion engine is placed between the outer molding and the inner molding.

7. The air cleaner for an internal combustion engine according to claim 1, wherein
the housing includes
a case having a case circumferential wall surrounding a case opening, a case bottom wall arranged on a side opposite to the case opening, and the inlet passage, and
a cap having a cap circumferential wall surrounding a cap opening, a cap bottom wall arranged on a side opposite to the cap opening, and the outlet passage,
the filter element includes a filtration portion placed between the case opening and the cap opening, which faces the case opening,
the case includes a case body and the fiber molding assembly,
the case body includes the case circumferential wall, the case bottom wall, and the recess, which is an inwardly recessed part of the case bottom wall, and
the fiber molding assembly is fixed to the case circumferential wall and the case bottom wall.

8. An air cleaner for an internal combustion engine, the air cleaner comprising:
a housing including an inlet passage for introducing intake air and an outlet passage for discharging the intake air; and
a filter element located within the housing, wherein
the housing includes:
a housing body formed by a plastic molding, wherein the housing body has a wall located upstream of the filter element in an air flow direction and a recess, which is an inwardly recessed part of the wall, and
a fiber molding assembly, which is fixed to the wall, covers the recess from outside, and forms a part of a side wall of the inlet passage together with the recess,
wherein a communication hole for communication between the inlet passage and an interior of the housing body is formed in the recess, and
the fiber molding assembly contains:
a base fiber, and
a binder fiber having a melting point lower than a melting point of the base fiber, the binder fiber being thermally fused to the base fiber in order to bind filaments in the base fiber together.

9. The air cleaner for an internal combustion engine according to claim 8, wherein
the housing has a tubular shape,
the inlet passage is formed in a circumferential wall of the housing and extends in a tangential direction of the circumferential wall,
the outlet passage is formed in a bottom wall of the housing,
the filter element includes a tubular filtration portion, and
the housing includes
the housing body having the circumferential wall, the bottom wall, and the recess, which is an inwardly recessed part of the circumferential wall, and
the fiber molding assembly fixed to the circumferential wall and the bottom wall.

* * * * *